Patented Nov. 10, 1953

2,658,911

UNITED STATES PATENT OFFICE 2,658,911

1,1,2-TRIMETHYL-PROPEN-2-YL 3-OXOBUTANOATE AND ITS PREPARATION

Walter Kimel, Highland Park, N. J., assignor to Hoffmann-La Roche Inc., Nutley, N. J., a corporation of New Jersey No Drawing. Application June 10, 1952,
Serial No. 292,730

The portion of the term of the patent subsequent to February 10, 1970, has been disclaimed 2 Claims. (Cl. 260—483)

This invention relates to a novel chemical compound, and to process of preparing and converting said compound. More particularly, the invention is concerned with the new substance 1,1,2-trimethyl-propen - 2 - yl 3 - oxobutanoate which can be represented by the formula $$CH_3COCH_2COO.C(CH_3)_2C(CH_3)=CH_2$$

This substance can be prepared by condensing 2,3-dimethyl-buten-2-ol-2 with diketene, and the product can be converted by heating (with loss of carbon dioxide) into 2,3-dimethyl-hepten-2-one-6. The latter can be converted to methylcitral, methyl-gereniol or pseudoirone by known processes, and thus the invention is of interest to the pharmaceutical, perfume and soap industries.

The invention is further disclosed in the following example, which is illustrative but not limitative thereof.

Example

In a flask equipped with a stirrer, a thermometer, a dropping funnel, and a drying tube, 0.5 g. of sodium was reacted with 200 g. (2.0 mol) of 2,3-dimethyl-buten-3-ol-2. The solution was cooled to 10° C. and 202 g. (2.4 mols) of diketene was added slowly, with efficient stirring, during five hours, while maintaining the temperature at 10° C. The mixture was then stirred for 24 hours at 10° C.

The resulting dark orange solution was diluted with 200 cc. of toluene and extracted four times with 200 cc. portions of saturated sodium bicarbonate solution, and then washed with water until neutral. The organic solution was dried over calcium sulphate, and concentrated in vacuo. The residue was fractionated under reduced pressure to yield 1,1,2-trimethyl-propen-2-yl 3-oxobutanoate, B. P. (4 mm.) 75°–85° C.; $n_D^{25}=1.4461$.

In a one-liter-3-neck flask, connected to a gas meter through an efficient reflux condenser, and also equipped with a stirrer and thermometer, was placed 276 g. (1.5 mols) of 1,1,2-trimethyl-propen-2-yl 3-oxobutanoate. The flask was heated in an oil bath at 130°–170° C. Evolution of carbon dioxide commenced at about 125° C., and was complete after 3 hours at 140° to 150° C. The product was purified by distillation under reduced pressure, yielding 2,3-dimethyl-hepten-2-one-6; B. P. 74°–77° C. (9 mm.); $n_D^{25}=1.4480$.

I claim:

1. The compound 1,1,2-trimethyl-propen-2-yl 3-oxobutanoate.

2. A process of preparing 1,1,2-trimethyl-propen-2-yl 3-oxobutanoate which comprises condensing diketene with 2,3-dimethyl-buten-3-ol-2.

WALTER KIMEL.

No references cited.